| United States Patent [19] | [11] Patent Number: 4,652,276 |
| Burden | [45] Date of Patent: Mar. 24, 1987 |

[54] HIGH TOUGHNESS SILICON NITRIDE CUTTING TOOLS

[75] Inventor: Stephen J. Burden, Troy, Mich.

[73] Assignee: GTE Valeron Corporation, Troy, Mich.

[21] Appl. No.: 837,974

[22] Filed: Mar. 10, 1986

[51] Int. Cl.⁴ ............................................. B24D 3/02
[52] U.S. Cl. ....................................... 51/308; 51/309; 501/97; 501/98; 501/121; 501/122; 501/152; 501/154
[58] Field of Search ..................... 51/308, 309; 501/97, 501/98, 121, 122, 152, 154

[56] References Cited

U.S. PATENT DOCUMENTS

| 4,365,022 | 12/1982 | Tabata et al. | 501/98 |
| 4,401,617 | 8/1983 | Ezis et al. | 501/98 |
| 4,424,066 | 1/1984 | Sarin et al. | 501/98 |
| 4,426,209 | 1/1984 | Sarin et al. | 501/98 |
| 4,434,238 | 2/1984 | Ezis et al. | 501/98 |
| 4,557,244 | 12/1985 | Allor | 501/97 |

*Primary Examiner*—Stephen J. Lechert, Jr.
*Attorney, Agent, or Firm*—Robert E. Walter

[57] ABSTRACT

A silicon nitride cutting tool primarily for cutting cast iron comprises a granular phase consisting essentially of silicon nitride and an intergranular amorphous phase consisting essentially of magnesium oxide, yttrium oxide and silicon oxide wherein the components are present in specified amounts and ratios.

6 Claims, No Drawings

HIGH TOUGHNESS SILICON NITRIDE CUTTING TOOLS

BACKGROUND OF THE INVENTION

Silicon Nitride has generated considerable interest as a potential replacement for metals in applications requiring high strength at elevated temperatures, good thermal shock resistance and high resistance to oxidation and corrosion.

It is well known that the properties of the densified body are greatly dependent on the density, and it has been found necessary to add sintering aids to Silicon Nitride in order to fully densify the body. Typically the sintering aids used are $Al_2O_3$, BeO, MgO, $TiO_2$, $ZrO_2$, $HfO_2$, and the oxides of the Group III elements of the periodic table, Scandium, Yttrium, Lanthanum, Cerium, etc.

It is also known that these sintering aids combine with the $SiO_2$ which is normally present in the Silicon Nitride raw material to form grain boundary phases, which can be either crystalline or amphorous. The final product thus consists of grains of $Si_3N_4$, either in the alpha or beta crystalline form, surrounded by one or more grain boundary phases consisting of silicon, nitrogen, oxygen, and the sintering aids. The properties of the final product are greatly influenced by the composition and properties of this grain boundary phase(s).

Silicon nitride compositions for use as cutting tools have concentrated on improving the high temperature properties of strength, hardness, and oxidation resistance.

For example, U.S. Pat. No. 4,227,842 to Samanta relates to a silicon nitride cutting tool for machining cast iron having a composition containing silicon nitride, silicon oxide and yttrium oxide. This patent also mentions a Prior art cutting tool material set forth in Japanese Pat. No. 49-113803 (10-30-1974) by Kazutaka Ohgo which appears in Chemical Abstracts, Volume 84, 1976, page 286. According to this work, silicon nitride is sintered with a metal oxide spinel. The spinel is formed prior to sintering by mixing magnesium oxide and yttrium oxide and heating to the appropriate temperature.

U.S. Pat. No. 4,388,085 to Sarin, et al relates to a composite cutting tool having an intergranular refractory phase comprising silicon nitride, magnesium oxide, and silicon dioxide.

U.S. Pat. No. 4,073,845 to Buljan relates to a process for producing a silicon nitride composite from an amorphous silicon nitride powder and a sintering aid which includes magnesium oxide or yttrium oxide.

U.S. Pat. No. 4,280,973 to Moskowitz, et al relates to a process of making a silicon nitride cutting tool by cold pressing and then sintering a powder constituting at least 75% by weight silicon nitride, another powder selected from the group consisting from yttrium oxide, magnesium oxide, cerium oxide, zirconium oxide, and mixtures thereof, and an additional powder selected from the group consisting of aluminum oxide, tungsten carbide, tungsten silicide, tungsten, tantanium carbide and mixtures thereof.

U.S. Pat. No. 4,327,187 to Komatsu, et al relates to a process of making silicon nitride articles consisting of yttrium oxide, aluminum oxide, aluminum nitride, and another powder selected from the group of titanium oxide, magnesium oxide, and zirconium oxide.

It is generally accepted that $Si_3N_4$ bodies made with MgO have inferior high temperature properties to those bodies made with $Y_2O_3$ sintering aids. In many instances, the improvement in high temperature properties have been accompanied by the impairment of other properties. While the prior art recognizes the influence of grain boundary phases on the mechanical properties of silicon nitride compositions, the effect of grain boundary phase composition on the machining performance of silicon nitride cutting tools is incompletely understood. Notwithstanding the properties of the foregoing compositions, enhancement of the metal cutting performance of silicon nitride cutting tools remains a highly desirable object.

SUMMARY OF THE INVENTION

The present invention is directed to silicon nitride cutting tools having outstanding resistance to thermal and mechanical shock.

Tools of the present invention exhibit markedly improved performance in metal cutting applications, particularly in the interrupted machining or milling of ferrous and non-ferrous alloys, most particularly cast iron alloys, as compared to prior art silicon nitride or aluminum oxide cutting tools.

Further, the tools of the present invention are capable of being manufactured by hot pressing, pressureless sintering, overpressure sintering or sinter-hipping as desired.

It has been found that when $Y_2O_3$ and MgO are used together in certain proportions, the densified $Si_3N_4$ body has outstanding toughness in metal cutting applications, much more so than $Si_3N_4$ bodies made with MgO or $Y_2O_3$ singularly.

In accordance with the present invention, there is provided a silicon nitride cutting tool comprising a granular phase consisting essentially of silicon nitride and an intergranular amorphous phase consists essentially of magnesium oxide, yttrium oxide and silicon oxide. The weight percent of the constituents include magnesium oxide from about 0.5 to about 10, yttrium oxide from about 2.5 to about 10 percent, aluminum oxide at less than about 0.5 percent, and silicon oxide present in an amount less than about 2.5 percent. The ratio of yttrium oxide to magnesium oxide is from about 1:1 to about 7:1. The balance of the cutting tool consists essentially of beta-silicon nitride.

DETAILED DESCRIPTION

The silicon nitride compositions of the present invention are composed predominantly of silicon nitride in the beta or high temperature crystalline form. Preferably, the starting raw material $Si_3N_4$ powder should be in the alpha (low temperature) crystalline form or in the non-crystalline, amorphous form or mixtures thereof. For optimum results, the beta content of the raw material should be less than 15% of the total $Si_3N_4$ content.

In accordance with the present invention, the silicon nitride compositions must contain yttrium oxide and magnesium oxide as sintering aids in the range of 5 to 20 weight percent of the total, the balance being silicon nitride. The preferred range is from about 5 to about 12 percent. The weight ratio of yttrium oxide to magnesium oxide must be in the range from 1.0 to 1 to 7.0 to 1 for the starting powder mix. The preferred range is from about 1 to 1 to about 4 to 1.

The purity of the $Si_3N_4$ raw material is also an important consideration. Impurities which may be present in the starting powders tend to concentrate in the intergranular phase of the densified article. Impurities may also find their way into the finished article during processing steps of a starting powder composition which has the desired initial high purity. The oxygen content of the silicon nitride raw material is usually present in the form of $SiO_2$ and must be taken into consideration for accurate control of the grain boundary phases. Other impurities such as carbon or free silicon must be controlled so as to compensate their effect on the intergranular phase of the finished article.

The silicon nitride compositions of the present invention are composed of silicon nitride grains surrounded by an intergranular phase consisting of $SiO_2$, MgO, $Y_2O_3$, and a indeterminate amount of nitrogen. The usual form of this intergranular phase is a magnesium yttrium silicate glass, although crystalline phases can be produced by proper heat treatment. The composition of the intergranular phase of the present invention, excluding nitrogen, is preferably 10 to 60 weight percent $SiO_2$, 20 to 70 weight percent $Y_2O_3$, and 5 to 45 weight percent MgO.

Small amounts of aluminum oxide, less than 1 weight percent of the total composition, can be tolerated as an impurity without a drastic change in performance. Inert materials such as tungsten carbide or titanium nitride should be present in amounts less than 5 and preferably less than 3 weight percent of the total composition.

Embodiments of the present invention can be seen in the following examples:

EXAMPLE 1

About 95 parts of silicon nitride powder containing 1.33 weight percent oxygen and composed of 90% alpha phase was mixed with 2.5 parts magnesium oxide and 2.5 parts yttrium oxide. The mixture was ball milled with 500 ml of naptha in a rubber lined mill using WC-Co grinding balls for 12 hours. The amount of tungsten pickup was less than one weight percent. The mixture was dried and charged into a graphite mold and hot pressed at 1750° C., 4,500 psi, for 60 minutes in an argon atmosphere. The density of the part was measured to be 3.23 g/cc and the Rockwell A hardness was measured to be 93.0 to 93.5. X-ray diffraction of the finished piece indicated the silicon nitride had completely transformed into the beta phase.

The compositions shown in Table I were prepared according to the method used in example 1. A.N.S.I. style SNG433 cutting tips were prepared from the hot pressed pieces. The cutting edges were chamfered 20° by 0.008" wide.

The cutting inserts were used to face mill a 2 inch diameter bar of nodular cast iron, 220 BHN. The milling cutter used was 6" in diameter with −5° axial rake and −5° radial rake. The lead angle was 15°. The machining conditions used were 1360 surface feet per minute cutting speed, 0.060" depth of cut, and a feed rate of 0.005 inches per revolution. Successive passes were taken on the cast iron and the cutting edges were examined for flank wear and chippage every eighth pass. Testing was terminated when the flank wear or chippage exceeded 0.015" depth as measured in a toolmakers microscope, or 48 passes. The data shown in Table II are the average results of a minimum of two tests.

Composition 1 is a typical prior art silicon nitride material while composition 2 is a commercial cutting tool. The commercial $Y_2O_3$ containing cutting tool is an improvement over prior art MgO containing materials, but compositions of this invention show greatly improved performance over typical $Si_3N_4$—$Y_2O_3$ compositions. Compositions 6 and 7, which are outside the scope of this invention, clearly show the importance of precise control of the grain boundary phase composition.

Compositions 17 and 18 have similar grain boundary compositions and had similar machining performance. Composition 18 was made with high oxygen content $Si_3N_4$ powder while composition 17 was made with low oxygen content powder with added $SiO_2$. The results indicate that the oxygen content of the starting raw material can be as high as 3.5 weight percent without greatly changing the performance.

TABLE I

| STARTING COMPOSITION | GRAIN BOUNDARY PHASE COMPOSITION (wt %)[1] | | |
|---|---|---|---|
| | $SiO_2$[2] | MgO | $Y_2O_3$ |
| 1. $Si_3N_4$ + 4 MgO | 37.5 | 62.5 | — |
| 2. $Si_3N_4$ + 8 $Y_2O_3$[3] | 22 | — | 88 |
| 3. $Si_3N_4$ + 1.5 MgO + 5.5 $Y_2O_3$ | 25 | 16 | 59 |
| 4. $Si_3N_4$ + 2.5 MgO + 4.5 $Y_2O_3$ | 25 | 27 | 48 |
| 5. $Si_3N_4$ + 3.5 MgO + 3.5 $Y_2O_3$ | 25 | 37.5 | 37.5 |
| 6. $Si_3N_4$ + 4.5 MgO + 2.5 $Y_2O_3$ | 25 | 48 | 27 |
| 7. $Si_3N_4$ + 5.5 MgO + 1.5 $Y_2O_3$ | 25 | 59 | 16 |
| 8. $Si_3N_4$ + 1.0 MgO + 1.0 $Y_2O_3$ | 55 | 22.5 | 22.5 |
| 9. $Si_3N_4$ + 2.5 MgO + 2.5 $Y_2O_3$ | 32 | 34 | 34 |
| 10. $Si_3N_4$ + 4.5 MgO + 4.5 $Y_2O_3$ | 20 | 40 | 40 |
| 11. $Si_3N_4$ + 6.0 MgO + 6.0 $Y_2O_3$ | 16 | 42 | 42 |
| 12. $Si_3N_4$ + 8.0 MgO + 8.0 $Y_2O_3$ | 12 | 44 | 44 |
| 13. $Si_3N_4$ + 10.0 MgO + 10.0 $Y_2O_3$ | 10 | 45 | 45 |
| 14. $Si_3N_4$ + 2.5 MgO + 3.5 $Y_2O_3$ | 28 | 30 | 42 |
| 15. $Si_3N_4$ + 1.5 MgO + 3.5 $Y_2O_3$ | 32 | 20 | 48 |
| 16. $Si_3N_4$ + 0.5 MgO + 6.5 $Y_2O_3$ | 25 | 5 | 70 |
| 17. $Si_3N_4$ + 3.5 MgO + 3.5 $Y_2O_3$ + 2.5 $SiO_2$ | 40 | 30 | 30 |
| 18. $Si_3N_4$ + 3.5 MgO + 3.5 $Y_2O_3$ | 45 | 27.5 | 27.5 |

[1]Neglecting nitrogen content.
[2]Based on an oxygen content of 1.33 wt. % of the $Si_3N_4$.
[3]Commercial Tool - contains 1–2 wt. % $Al_2O_3$.

TABLE II

| COMPOSITION | AVERAGE NUMBER OF PASSES TO FAILURE | REMARKS |
|---|---|---|
| 1 | 9 | Chipping |
| 2 | 24 | Chipping |
| 3 | >48 | Uniform Flank Wear |
| 4 | >48 | Uniform Flank Wear |
| 5 | >48 | Uniform Flank Wear |
| 6 | 15 | Fracture |
| 7 | 5 | Fracture |
| 8 | 20 | Chipping |
| 9 | 39 | Chipping |
| 10 | 45 | Slight Chipping |
| 11 | >48 | Uniform Flank Wear |
| 12 | >48 | Uniform Flank Wear |
| 13 | 48 | Slight Chipping |
| 14 | >48 | Uniform Flank Wear |
| 15 | >48 | Uniform Flank Wear |
| 16 | 48 | Slight Chipping |
| 17 | 48 | Slight Chipping |
| 18 | 48 | Slight Chipping |

What is claimed is:

1. A silicon nitride cutting tool for cast iron comprising a granular phase consisting essentially of silicon nitride and an intergranular amorphous phase consisting essentially of magnesium oxide, yttrium oxide, and silicon oxide wherein said magnesium oxide is present in an amount from about 0.5 to about 10 weight percent of the total, said yttrium oxide is present in an amount of about 2.5 to about 10 weight percent of the total wherein the ratio of yttrium oxide to magnesium oxide is from about 1:1 to about 7:1, and the balance consists of less than five percent by weight impurities and milling medium.

2. A silicon nitride cutting tool according to claim 1 consisting from 80 to 97 percent silicon nitride, 0.5 to 10.0 weight percent magnesium oxide, and from 2.5 to 10.0 weight percent yttrium oxide wherein the weight ratio of yttrium oxide to magnesium oxide must be in the range of from 0.1 to 1 to 4.0 to 1.

3. A silicon nitride cutting tool according to claim 2 wherein the composition of the intergranular phase consists of from 10 to 60 weight percent $SiO_2$, from 25 to 70 weight percent $Y_2O_3$ and from about 5 to 45 weight percent MgO.

4. A silicon nitride cutting tool according to claim 2 wherein aluminum oxide is present as an impurity in amounts up to 1 weight percent of the total composition.

5. A silicon nitride cutting tool according to claim 3 wherein tungsten carbide and/or titanium nitride is present as an impurity in amounts less than 3 weight percent of the total composition.

6. A silicon nitride cutting tool according to claim 3 wherein the oxygen content of the silicon nitride is from 0.1 to 3.5 weight percent.

* * * * *